2 Sheets--Sheet 1.

J. CAMPBELL.

Corn-Planters.

No. 6,040. Reissued Sept. 1, 1874.

James Campbell.

Witnesses: H. M. Richardson, L. M. Poor

By James L. Norris, Atty.

THE NORRIS PETERS CO., WASHINGTON, D. C.

J. CAMPBELL.

Corn-Planters.

No. 6,040. Reissued Sept. 1, 1874.

H. M. Richardson
S. M. Post } witnesses

James Campbell.
By James L. Norris,
Atty.

THE NORRIS PETERS CO., WASHINGTON, D. C.

UNITED STATES PATENT OFFICE.

JAMES CAMPBELL, OF HARRISON, OHIO, FOR HIMSELF AND JAMES A. CAMPBELL, ADMINISTRATOR OF WILLIAM CAMPBELL, DECEASED, ASSIGNEE OF ONE-HALF INTEREST.

IMPROVEMENT IN CORN-PLANTERS.

Specification forming part of Letters Patent No. 54,642, dated May 8, 1866; reissue No. 3,836, dated February 15, 1870; reissue No. 5,078, dated October 1, 1872; reissue No. 6,040, dated September 1, 1874; application filed July 18, 1874.

*To all whom it may concern:*

Be it known that I, JAMES CAMPBELL, of Harrison, in the county of Hamilton and State of Ohio, have invented an Improved Corn-Planter, of which the following is a specification:

This is a walking-planter, primarily designed for planting in "drills," but adapted also to plant in "hills." It is of the class of planters which have rotary droppers or measurers operated by gearing-connection with pilot ground-wheels.

The first part of my invention consists in constructing the seed-box so that the dropping-plate will be properly combined with the sides and bottom of the seed-box, the latter having suitable chaff-holes, so that the plates may otherwise be closely fitted.

The second part of the invention consists in a peculiar formation of the walls of the grain-box, to prevent the grains from crowding beneath the same under the action of the dropper, and to provide a properly-arranged cove for the cut-off brush.

The third part of the invention consists in a fender-plate to support the front of the grain-box and shield the dropper-gearing from dirt.

The fourth part of the invention consists in the employment of a pivoted grain-box or hopper as means for throwing the rotary dropper in and out of gear, and in means for supporting and locking the same.

The fifth part of the invention consists in means for supporting and journaling the axle of the ground-wheel, and for preventing any spreading of the frame.

Figure 1:
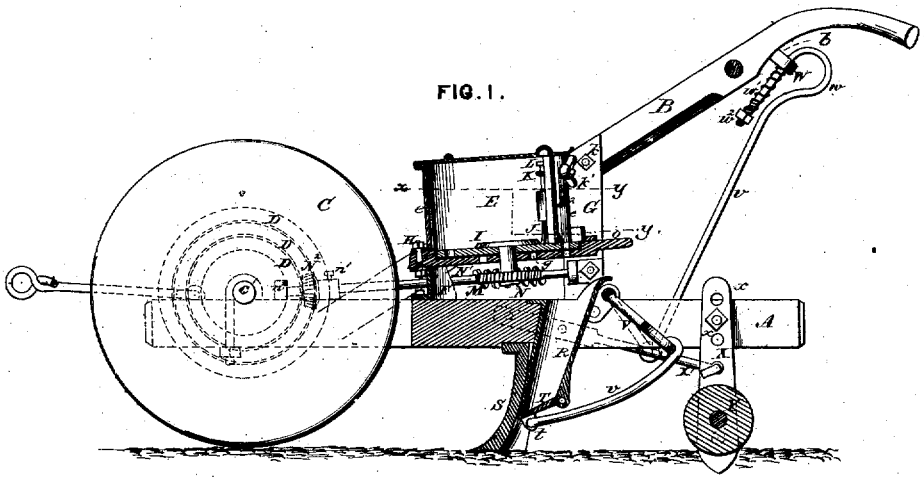
Figure 2:
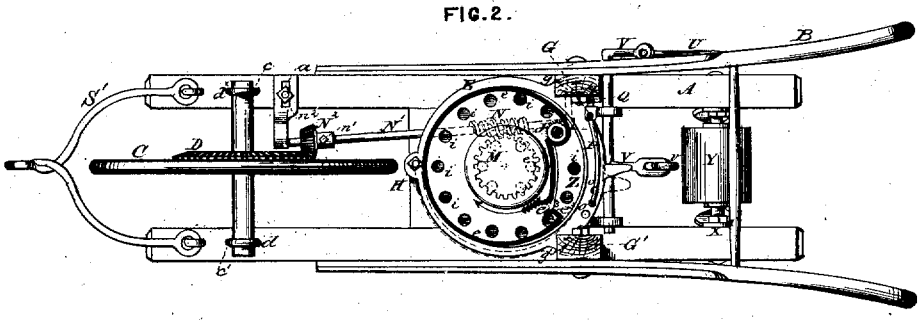
Figure 3:
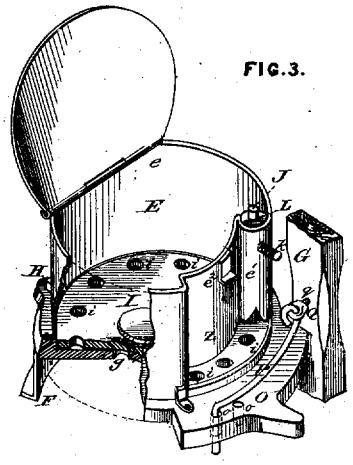
Figure 5:
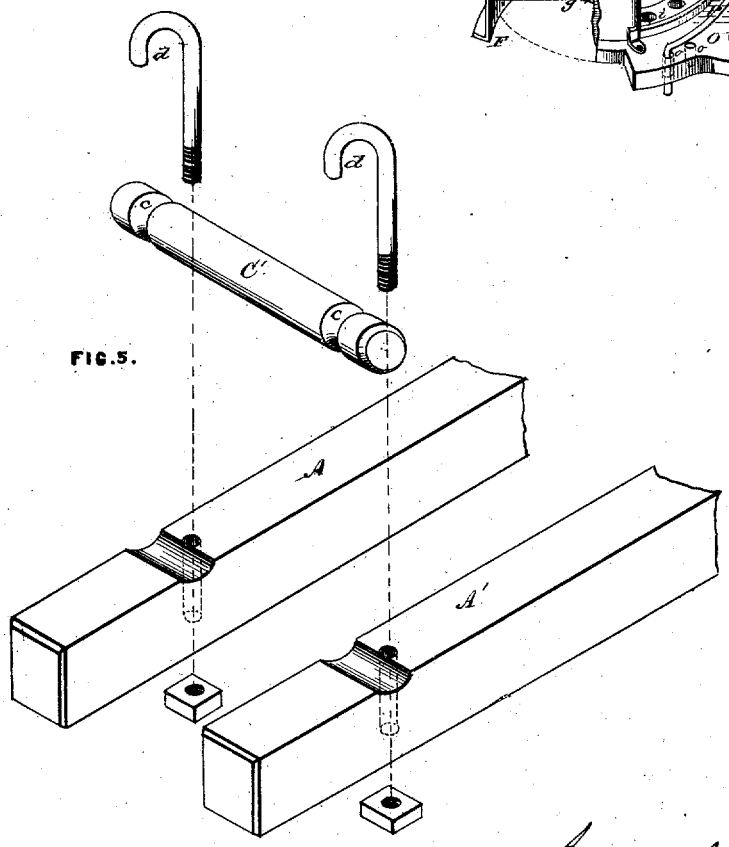
Figure 4:
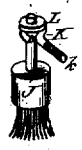

Figure 1 is a vertical longitudinal section of the improved drill. Fig. 2 is a plan or top view of the same, partly in section. Fig. 3 is a perspective view of the grain-box with portions broken off to show the construction of the parts. Fig. 4 is a perspective view of the cut-off brush and its support. Fig. 5 is a perspective view on a larger scale, illustrating the means for journaling the ground-wheel axle.

A represents the right-hand beam, and B the right-hand handle, of a double-beamed planter-frame. Journaled to the front part of the frame A is a ground-wheel, C, having a series of concentric bevel-gear wheels, D. The axle C′ of the ground-wheel C has two circumferential grooves, *c c′*, to receive hooks or staples *d*, which form shouldered bearings, to hold the drive-wheel in gear with its pinion, and to prevent the spreading of the beams. The grain-box E is preferably pivoted in front to the curved plate F by pivot-bolt H, and its back is supported in two notches, *g g′*, in posts G G′. The curved plate F serves the purpose chiefly of a fender to intercept and divert to either side all trash and dirt that would otherwise pass underneath the grain-box and clog the gearing and grain-passages. The grain-box E is composed of a bottom plate, O, which supports a body, *e*, cylindrical in general shape, to conform to the circular rotary drop-plate or dropper I, which forms the entire floor thereof, so as to leave no space for the lodgment of grain. A series of holes, *g*, is provided in the bottom O, inside the bearing parts or plates O and I, to allow the escape of chaff which passes into apertures I′. By recessing the dropper I into the plate O, and having the side or circumference of the box marginal to the dropper, the seed is all carried on the dropper I, close joints are secured, and the dust, chaff, and dirt are carried off without clogging the bearings. The dropper I is pierced, at equal distances around its circuit, with grain-measuring apertures *i*, each capable of receiving a single grain or the desired modicum of corn or other grain. The body *e* of the grain-box E, at a proper point for the cut-off brush J, trends inward, so as to form a cove, $e^1$, for the reception of the brush. From thence the wall extends to the general periphery on a line, $e^2$. $e^3$ represents a port or opening to admit return grains. The space Z, external of the indented wall $e^1 e^2$, is left open to expose the cells as they pass to and over the delivery-aperture $o^2$, so that any failure to operate may be at once seen and corrected. Should surplus grains escape, they may be carried back by the empty cells through the gate $e^3$. The formation of the box also serves to prevent the crowding of grains or kernels under the edge of the same. The grain is carried directly against and under the brush J. At all other points, owing to the construction of the box, the grain revolves concentric with or away from the walls, as indicated by arrow in Fig. 2. If it be preferred to employ a round brush, the end of the cove $e^1$ may have a concave form, as shown in Fig. 2. The brush J is held in position by means of a hook, K, having a screw-shank, $k$, and nut $k'$, and by a head, L, which fits and occupies the upper part of the recess $e^1$. This arrangement permits the use of the cheap and easily-renewed common circular brush, which brush, when worn or bent to one side, can be restored to efficiency by slackening the nut $k'$ and partially rotating the brush, so as to present a new and unworn set of bristles to the action of the grain.

A common painter's brush may be employed by cutting it of proper length and furnishing it with a washer or disk, L, to form the head.

The rotary dropper or grain-measurer I is furnished underneath with a worm-pinion, M, actuated by a worm-wheel, N, driven from the ground-wheel. The worm-wheel shaft $N^1$ is fitted at its front end with a beveled pinion, $N^2$, held by set-screw $n^1$, and thus shiftable into mesh with either of the gears D on the ground-wheel C. A slotted bracket, $n^2$, supports the shaft at this end, being secured by a bolt, $a$, and suitably held against lateral movement.

The mesh of the front gearing may thus be regulated, and the pinion $N^2$ readily shifted, by simply loosening the nut of the bolt $a$ and driving the pinion out of mesh, and then into mesh, with the proper gear.

The box-plate O has two or more perforations, $o$ $o^1$, to receive a hook, P, linked to an eye, Q, which eye has a screw-shank, $q$, by which it can be adjusted forward or backward, so that, when the hook P is engaged in the perforation $o^1$, the worm-gearing M N will be accurately in mesh.

When it is desired to disconnect the seed-delivery mechanism the hook P is withdrawn from the perforation $o^1$, and the box E being shifted to the left, the hook P is inserted in the perforation $o$, so as to hold the worm-pinion out of gear.

The hook P being linked to the same post G to which is attached the rear journal-box $n$ of the worm-shaft $N^1$, the worm N and its pinion M are held securely in gear, and are not liable to be spread apart by an accidental crowding of large grains, as would occur were the said hook and journal-bearing connected to different parts of the frame.

The rotation of the dropper or seed-measurer causes a single grain at a time, or desired modicum of grains, to drop at regular intervals into a spout, R, arranged immediately behind a drill-tooth, S. S′ represents an eye-bail, attached to the frame A and A′, and is made of sufficient depth to allow it to play freely over the wheel C. The lower end of the spout slopes obliquely upward from the rear of the drill-tooth, and is, when the implement is used for planting in hills, closed by a valve, T, connected by rods U and arms V with a spring-trigger, W. The valve T is hinged at its upper end directly to the spout R, and is constructed with an arm, $t$, to which the lower connecting-rod U is attached. The spring trigger or pull W consists of a hook, $w$, and a spiral spring, $w^1$, applied to the end of the same, between an abutment-guide, $b$, projecting from the handle B and an adjusting-nut, $w^2$. The hook $w$ may be engaged with directly by a finger, in usual manner. X X represent covering-shares, having perforations $x$, by which to vary the depth of cut. X′ X′ represent braces for the same, and Y a roller pivoted between the coverers.

The arrangement and position of the drill-tooth and dropping-spout are such as to protect the latter from interference by clods or trash, the upward and rearward inclination of the valve T enabling trash to easily escape it, and also enabling the grain to be liberated near the ground by a slight motion of the valve, and without striking it against the ground.

The flare and obliquity of the dropping-spout upward and rearward, and its distance below the drop-plate, are such as to afford the husbandman an uninterrupted view of the descending grain on its way from the dropping-plate to the ground, so that, should the spout or other portion of the grain-passages become clogged, the defect can be forthwith observed and remedied.

The provision for adjusting the worm-gear accurately to mesh enables the machine to be operated with more certainty and less labor than is usual with planters of this class.

The following is claimed as new:

1. The combination, in a seed-box for corn-drills, of the bottom plate O, with chaff-holes $g$, rotating dropper I, and circular box E, substantially as described.

2. The combination of the bottom plate O, with chaff-openings $g$, rotating dropper I, circular seed-box E, and the cove $e^1$, acting as a cut-off plate for the brush, substantially as herein set forth.

3. The combination of the bottom plate O, rotating dropper I, seed-box E, cut-off plate and cove $e^1$, and port or opening $e^3$, substantially as herein set forth.

4. The combination, with the grain-box, elevated above the frame, of the curved fender-plate F, supporting the front of said box and shielding the dropper-gearing, substantially as described.

5. A rotary-dropper grain-box, E, shiftable on a vertical pivot, substantially as herein described, as means for throwing the dropper-gearing in and out of mesh.

6. The combination, with the pivoted grain-box E, of the perforations $o$ $o^1$, hook P, and adjusting hinge-bolt Q, for the purposes set forth.

7. The combination, with the ground-wheel, of the axle C′, having grooves or shoulders $c$ $c$, adapted to be connected with the side beams of the frame by staples $d$, substantially as and for the purpose described.

8. In combination with the pinion M and openings $o$ of the pivoted grain-box, the worm-shaft $N^1$ and the hook P, both connected with the post G, for operation substantially as described, for the object specified.

9. The spring-pull W, for operating the hiller-valve U, the same consisting of a hook, $w$, and a spring, $w^1$, between an abutment-guide, $b$, and adjusting-nut $w^2$, substantially as herein shown and described.

In testimony whereof I have hereunto set my hand this 8th day of July, 1874.

JAMES CAMPBELL.

Witnesses:
EDWARD BOYD,
E. E. WOOD.